United States Patent
Song et al.

(10) Patent No.: US 8,208,544 B2
(45) Date of Patent: Jun. 26, 2012

(54) IMAGE CODING METHOD AND APPARATUS USING SIDE MATCHING PROCESS AND IMAGE DECODING METHOD AND APPARATUS FOR THE SAME

(75) Inventors: Byung-cheol Song, Suwon-si (KR); Yun-gu Lee, Yongin-si (KR); Nak-hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 975 days.

(21) Appl. No.: 12/197,451

(22) Filed: Aug. 25, 2008

(65) Prior Publication Data

US 2009/0147855 A1 Jun. 11, 2009

(30) Foreign Application Priority Data

Dec. 5, 2007 (KR) .......................... 10-2007-0125769

(51) Int. Cl.
*H04N 7/12* (2006.01)
*G06K 9/36* (2006.01)

(52) U.S. Cl. .................................. 375/240.12; 382/238
(58) Field of Classification Search .................... None
See application file for complete search history.

(56) References Cited

U.S. PATENT DOCUMENTS

| | | | |
|---|---|---|---|
| 2006/0209953 A1* | 9/2006 | Jung et al. ................. | 375/240.12 |
| 2006/0209960 A1* | 9/2006 | Katayama et al. ........ | 375/240.16 |
| 2006/0262854 A1* | 11/2006 | Lelescu et al. ............ | 375/240.16 |
| 2007/0133891 A1* | 6/2007 | Jeong ............................ | 382/238 |
| 2007/0171969 A1* | 7/2007 | Han et al. .................... | 375/240.1 |
| 2008/0008242 A1* | 1/2008 | Lu et al. ..................... | 375/240.16 |
| 2008/0089410 A1* | 4/2008 | Lu et al. ..................... | 375/240.03 |
| 2008/0253456 A1* | 10/2008 | Yin et al. .................... | 375/240.16 |
| 2008/0317131 A1* | 12/2008 | Lee et al. .................... | 375/240.16 |
| 2009/0067503 A1* | 3/2009 | Jeong et al. ................ | 375/240.16 |
| 2009/0161759 A1* | 6/2009 | Seo et al. .................... | 375/240.12 |
| 2009/0207917 A1* | 8/2009 | Kadono et al. ............ | 375/240.16 |
| 2010/0034274 A1* | 2/2010 | Li ............................. | 375/240.16 |

* cited by examiner

*Primary Examiner* — Clemence Han
(74) *Attorney, Agent, or Firm* — Sughrue Mion, PLLC

(57) ABSTRACT

A method and apparatus for coding an image capable of performing a prediction coding process by using a correlation degree between neighboring pixels of a current block and neighboring pixels of a reference block, and an image decoding method and apparatus. In the method, reference block candidates having neighboring pixels similar to the neighboring pixels of the current block are selected, matching errors between selected reference block candidates and the current block are calculated, and a reference block candidate having the least matching error is determined to be a predicted block of the current block.

24 Claims, 8 Drawing Sheets

IMAGE CODING METHOD AND APPARATUS USING SIDE MATCHING PROCESS AND IMAGE DECODING METHOD AND APPARATUS FOR THE SAME

CROSS-REFERENCE TO RELATED PATENT APPLICATION

This application claims the benefit of Korean Patent Application No. 10-2007-0125769, filed on Dec. 5, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a method and apparatus for decoding and coding an image, and more particularly, to a method and apparatus for decoding and coding an image by searching for reference blocks having neighboring pixels similar to neighboring pixels of a current block, determining a reference block candidate that is most similar to the current block among the reference block candidates as a predicted block of the current block, and performing a prediction-coding process for the predicted block.

2. Description of the Related Art

In an image compressing method such as Moving Picture Experts Group-1 (MPEG-1), MPEG-2, MPEG-4 H.264/ MPEG-4 Advanced Video coding (AVC), in order to code an image, a picture is divided into macro blocks. An optimal coding method is selected in consideration of a data size and a degree of distortion with respect to the macro blocks. The macro blocks are coded in the selected coding mode.

In an intra prediction method, blocks are coded, not by referring to a reference picture, but by using values of pixels that are spatially adjacent to the current block to be coded. First, a predicted block, with respect to the current block to be coded, is generated by using neighboring pixel values. Then, a residual block is generated by subtracting the predicted block from the current block, and the generated residual block is coded. Current macro blocks are prediction-coded in a mode among thirteen intra prediction modes so as to code the current block based on H.264 standards.

FIG. 1 illustrates 16×16 intra prediction modes, according to a conventional technique.

Referring to FIG. 1, the 16×16 intra prediction modes are divided into four modes comprising a vertical mode 0, a horizontal mode 1, a direct current (DC) mode 2, and a plane mode 3.

FIG. 2 illustrates 4×4 intra prediction modes, according to a conventional technique.

Referring to FIG. 2, the 4×4 intra prediction modes are divided into nine modes comprising a vertical mode 0, a horizontal mode 1, a DC mode 2, a diagonal down-left mode 3, a diagonal down-right mode 4, a vertical-right mode 5, a horizontal-down mode 6, a vertical-left mode 7, and a horizontal-up mode 8. The intra prediction mode numbers allocated to the modes as indices are determined based on usage frequencies of the modes. As described above, in the conventional intra prediction process, a predicted block is generated by using neighboring pixels of the current block to be coded with a thickness of one pixel. When there are many differences in an image between an intra-predicted block and neighboring blocks, there may be large differences between the intra-predicted block and an original block. In this case, performance of the intra prediction process using neighboring pixels may be deteriorated.

In addition, in the conventional inter prediction process, a predicted block of the current block is generated by performing a motion estimation and compensation process in units of various block sizes. However, in the conventional inter prediction process, motion vector information per block to be coded through the inter prediction process has to be transmitted. Accordingly, at a low bit rate, coding efficiency is deteriorated due to encoding of the motion vector information.

SUMMARY OF THE INVENTION

The present invention provides a method and apparatus for coding and decoding an image for improving prediction efficiencies and coding efficiencies by searching for reference blocks having neighboring pixels similar to neighboring pixels of a current block to be coded in a search area of a current picture that is previously coded, and using a predicted block of the current block.

The present invention also provides a method and apparatus for coding and decoding an image, which are capable of improving coding efficiency by reducing an amount of information of a motion vector when the current block is inter-predicted, by searching for reference blocks having neighboring pixels similar to neighboring pixels of a current block in a reference picture and using motion vector information for representing reference blocks as a predicted motion vector of the current block.

According to an aspect of the present invention, there is provided a method of coding an image, the method including determining at least one reference block candidate having neighboring pixels similar to neighboring pixels of a current block that is to be coded in a predetermined search area, determining a reference block candidate that is most similar to the current block among the reference block candidates as a predicted block of the current block, and coding an image by using a difference value obtained from a difference between the predicted block and the current block.

According to another aspect of the present invention, there is provided an apparatus for coding an image, the apparatus including a prediction unit which determines at least one reference block candidate having neighboring pixels similar to neighboring pixels of a current block that is to be coded in a predetermined search area and which determines a reference block candidate that is most similar to the current block among the reference block candidates as a predicted block of the current block, and a coding unit which codes an image by using a difference value obtained from a difference between the predicted block and the current block.

According to another aspect of the present invention, there is provided a method of decoding an image, the method including determining at least one reference block candidate having neighboring pixels similar to neighboring pixels of a current block that is to be decoded in a predetermined search area, determining a reference block candidate that is most similar to the current block among the reference block candidates as a predicted block of the current block, and decoding an image by using the predicted block of the current block and a difference value obtained from a difference between the predicted block and, the current block included in a bitstream.

According to another aspect of the present invention, there is provided an apparatus for decoding an image, the apparatus including a prediction unit which determines at least one reference block candidate having neighboring pixels similar to neighboring pixels of a current block to be decoded in a predetermined search area and which determines a reference block candidate that is most similar to the current block among the reference block candidates as a predicted block of the current block, and a decoding unit which decodes the image by using the predicted block of the current block and a difference value obtained from a difference between the predicted block and the current block included in a bitstream.

Accordingly, it is possible to improve compression efficiency by improving prediction performance for a current block. Since motion information of the current block during an inter-predicting process is transmitted as predetermined index information, it is possible to transmit efficient motion vector information in a less amount of data. Thus, it is possible to increase the compression efficiency.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY
EMBODIMENTS OF THE PRESENT
INVENTION

Hereinafter, the present invention will be described in detail by explaining exemplary embodiments of the invention with reference to the attached drawings.

In the present invention, a side matching process is defined as a procedure of searching for a reference block having neighboring pixels similar to neighboring pixels of a current block to be coded in a predetermined search area. Here, a predetermined search area represents an area previously encoded and restored in a current picture prior to the current block to be coded, or a reference picture area previously encoded and restored prior to the current picture. In a case where the reference picture is used, the predetermined search area may be an area within a predetermined pixel range from a block of the reference picture located at the same position as the current block.

Figure 1:
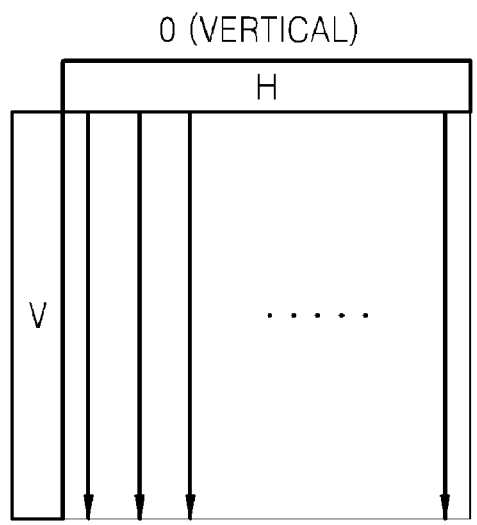
FIG. 1 is a diagram illustrating a 16×16 intra prediction mode, according to a conventional technique.
Figure 1:
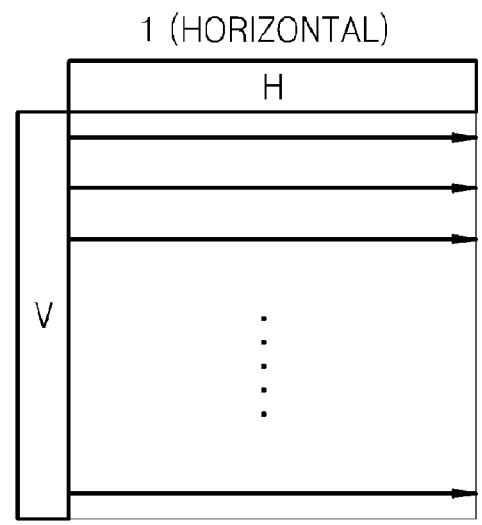
Figure 1:
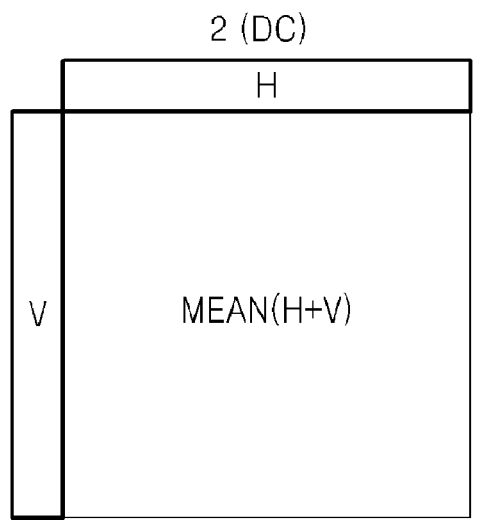
Figure 1:
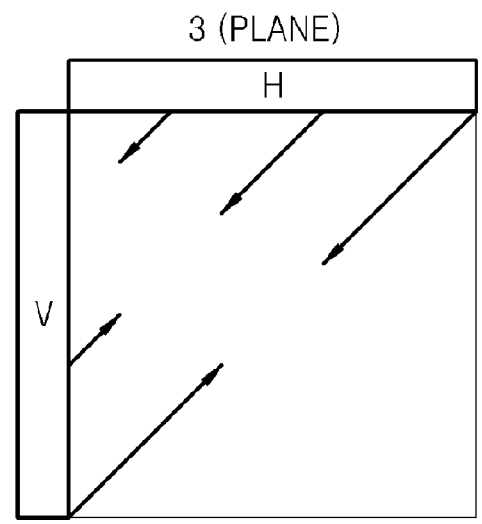
Figure 2:
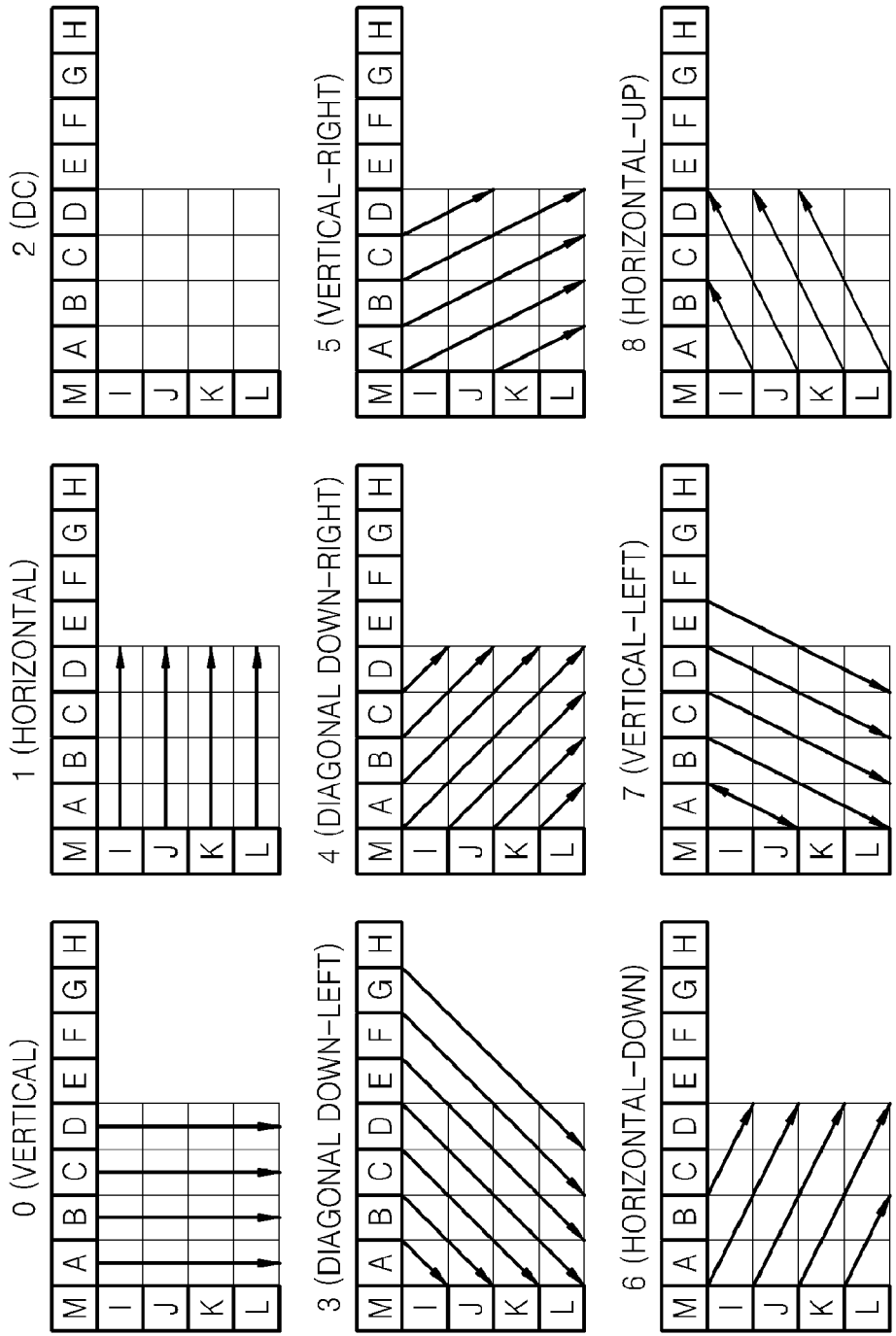
FIG. 2 is a diagram illustrating a 4×4 intra prediction mode, according to a conventional technique.
Figure 3:
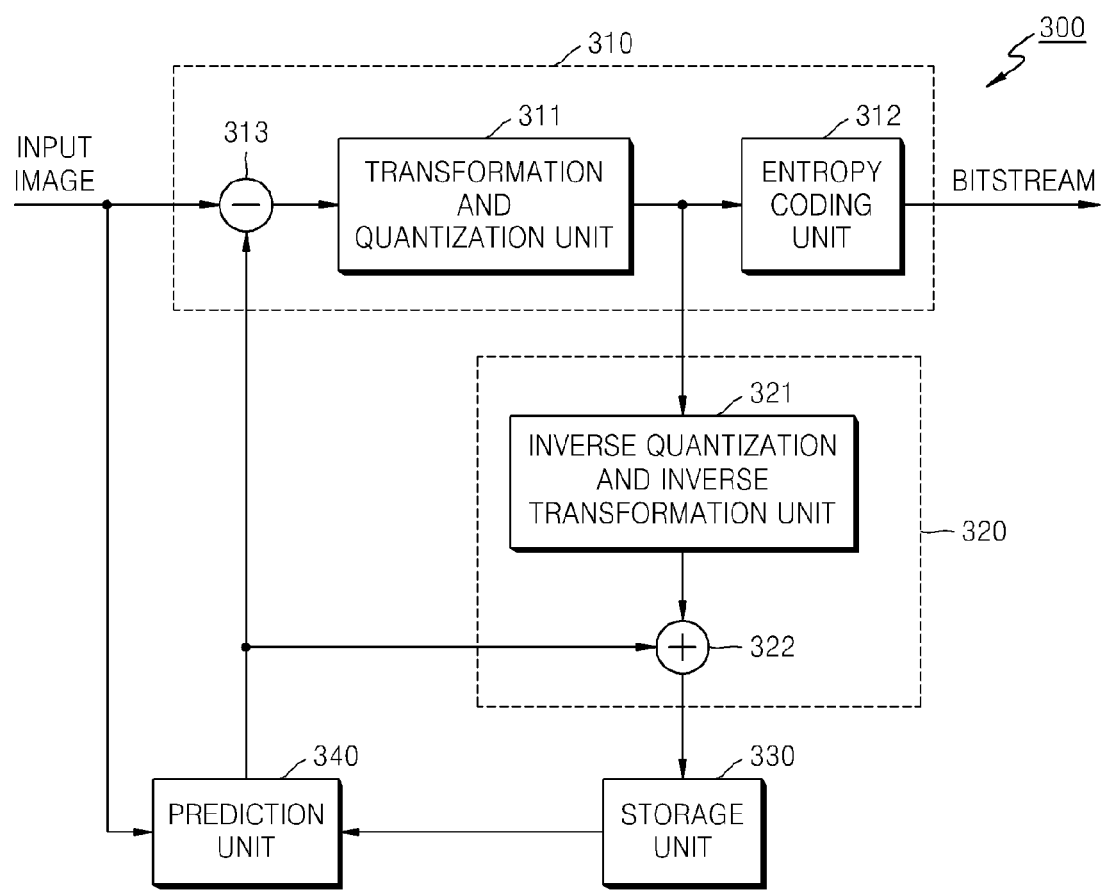
FIG. 3 is a block diagram illustrating a structure of an image coding apparatus 300, according to an exemplary embodiment of the present invention.

FIG. 3 is a block diagram illustrating a structure of an image coding apparatus 300, according to an exemplary embodiment of the present invention.

Referring to FIG. 3, the image coding apparatus 300 comprises a coding unit 310, a decoding unit 320, a recovering unit 320, a storage unit 330, and a prediction unit 340. The coding unit 310 comprises a transformation and quantization unit 311, an entropy coding unit 312, and a subtraction unit 313. The recovery unit 320 comprises an inverse quantization and inverse transformation unit 321 and an adding unit 322.

The prediction unit 340 determines at least one reference block candidate having neighboring pixels similar to neighboring pixels of the current block through the side matching process and determines a reference block candidate that is most similar to the current block among the reference block candidates as a predicted block of the current block.

Figure 4:
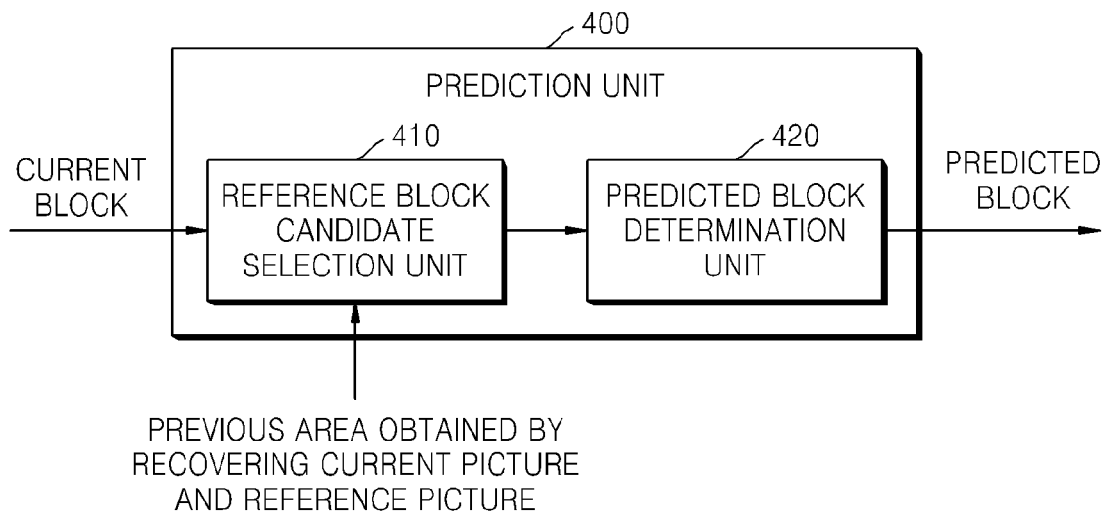
FIG. 4 is a block diagram illustrating a prediction unit 340 of FIG. 3, according to an exemplary embodiment of the present invention.

FIG. 4 is a block diagram illustrating a prediction unit 340 of FIG. 3, according to an exemplary embodiment of the present invention.

Referring to FIG. 4, a prediction unit 400 comprises a reference block candidate selection unit 410 and a predicted block determination unit 420. The prediction unit 400 may further comprise a motion prediction and compensation unit (not shown) and an intra prediction unit (not shown) that generates a predicted block through a conventional inter prediction process and a conventional intra prediction process. As described below, the prediction unit 400 generates a predicted block of the current block through a side matching process, according to the current exemplary embodiment of the present invention. In addition, the prediction unit 400 may adaptively apply a generation process of a predicted block through the side matching process according to the present exemplary embodiment. Also, the prediction unit 400 may further adaptively apply the conventional intra prediction process and the conventional inter prediction by comparing costs of a bitstream by, for example, comparing rate-distortion (RD) costs or comparing distortion degrees between the predicted block and the current block, which are obtained by coding a predicted block generated through the intra prediction process and the motion compensation and prediction process.

The reference block candidate selection unit 410 determines a predetermined number of reference block candidates having neighboring pixels similar to the neighboring pixels of the current block while moving a block having the same size as the current block to be coded in a predetermined search area.

Figure 5:
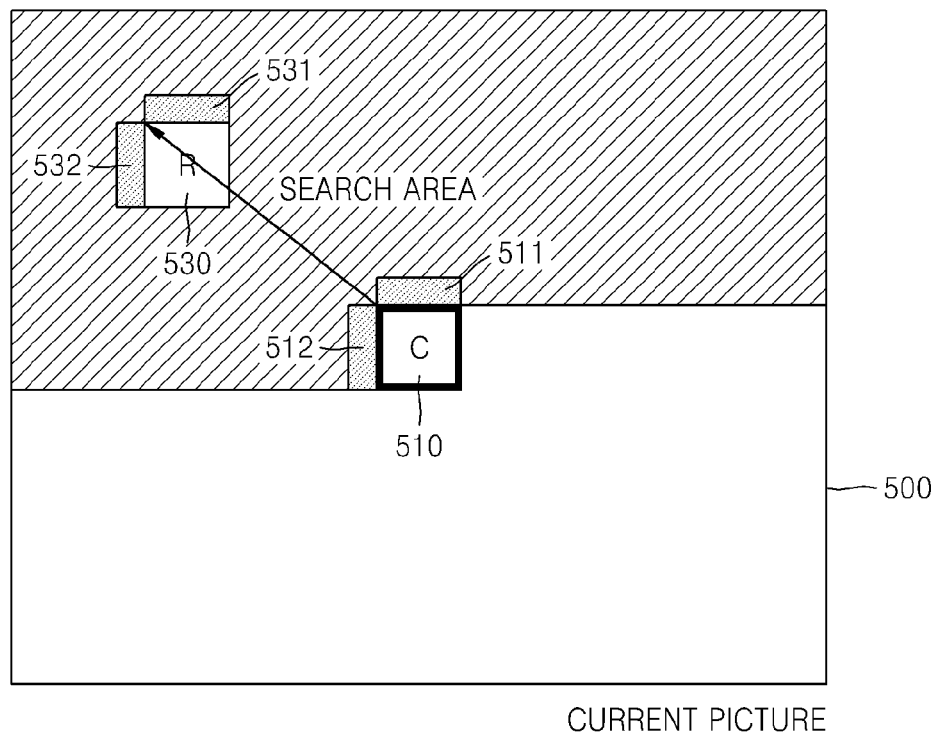
FIG. 5 is a reference diagram illustrating a procedure of determining reference block candidates by using a side matching process, according to an exemplary embodiment of the present invention.

FIG. 5 is a reference diagram illustrating a procedure of determining reference block candidates by using a side matching process, according to an exemplary embodiment of the present invention.

In FIG. 5, C indicates a current block 510 to be coded. Reference numerals 511 and 512 indicate neighboring pixels of the current block 510. In addition, R indicates a reference block 530 having the same size and the same shape as the current block 510. Reference numerals 531 and 532 indicate neighboring pixels of the reference block 530.

In a raster scan method of dividing an image into predetermined sized blocks and sequentially coding the divided blocks from left to right and from top to bottom, neighboring blocks located to the left and to the top of the current block 510 are previously coded blocks that have been recovered to be used as reference data so as to perform a prediction coding of the current block 510. The reference block candidate selection unit 410 evaluates a degree of similarity between the neighboring pixels 511 and 512 of the current block 510 and the neighboring pixels 531 and 532 of the reference block 530, while moving the reference block 530 within the search area, which is indicated as a shaded area, of the current picture 500. A method of evaluating a degree of similarity between the neighboring pixels 511 and 512 of the current block 510 and the neighboring pixels 531 and 532 of the reference block 530 will be described with reference to FIGS. 6A and 6B.

Figure 6A:
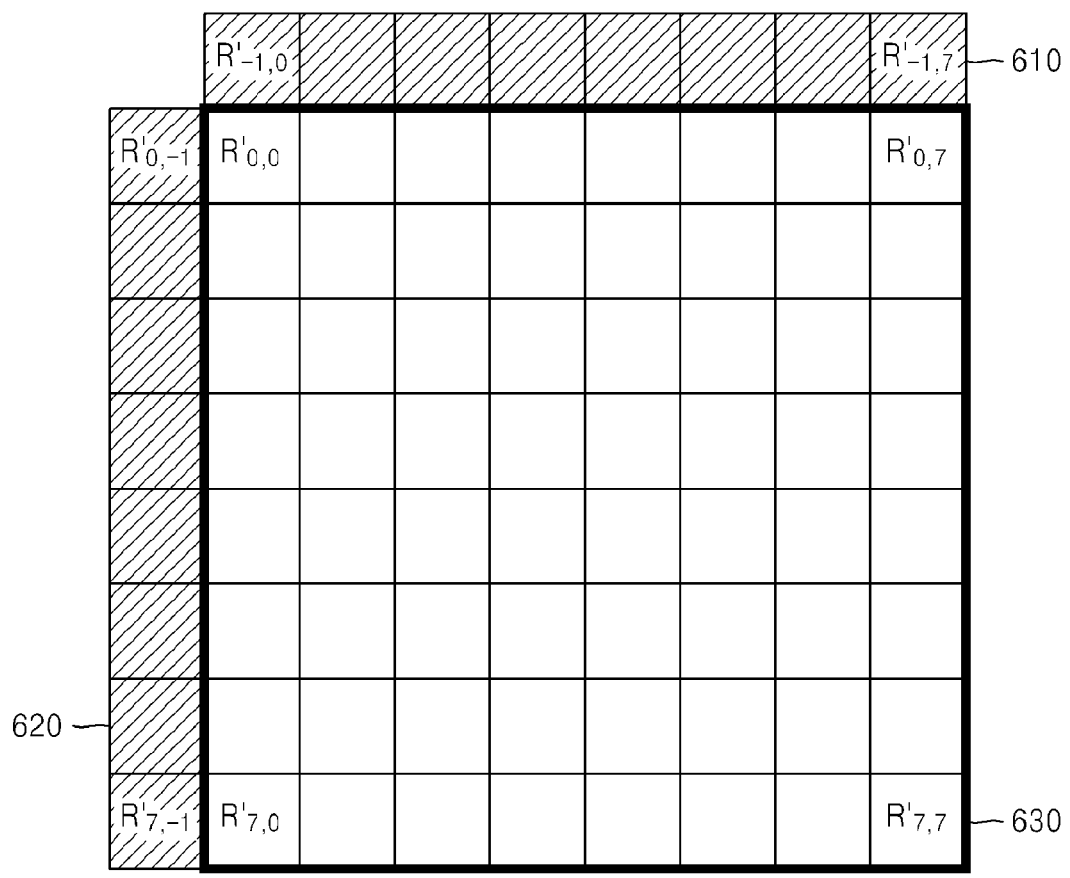
FIG. 6A is a reference diagram illustrating an 8×8 sized reference block and neighboring pixels of the reference block, according to an exemplary embodiment of the present invention.
Figure 6B:
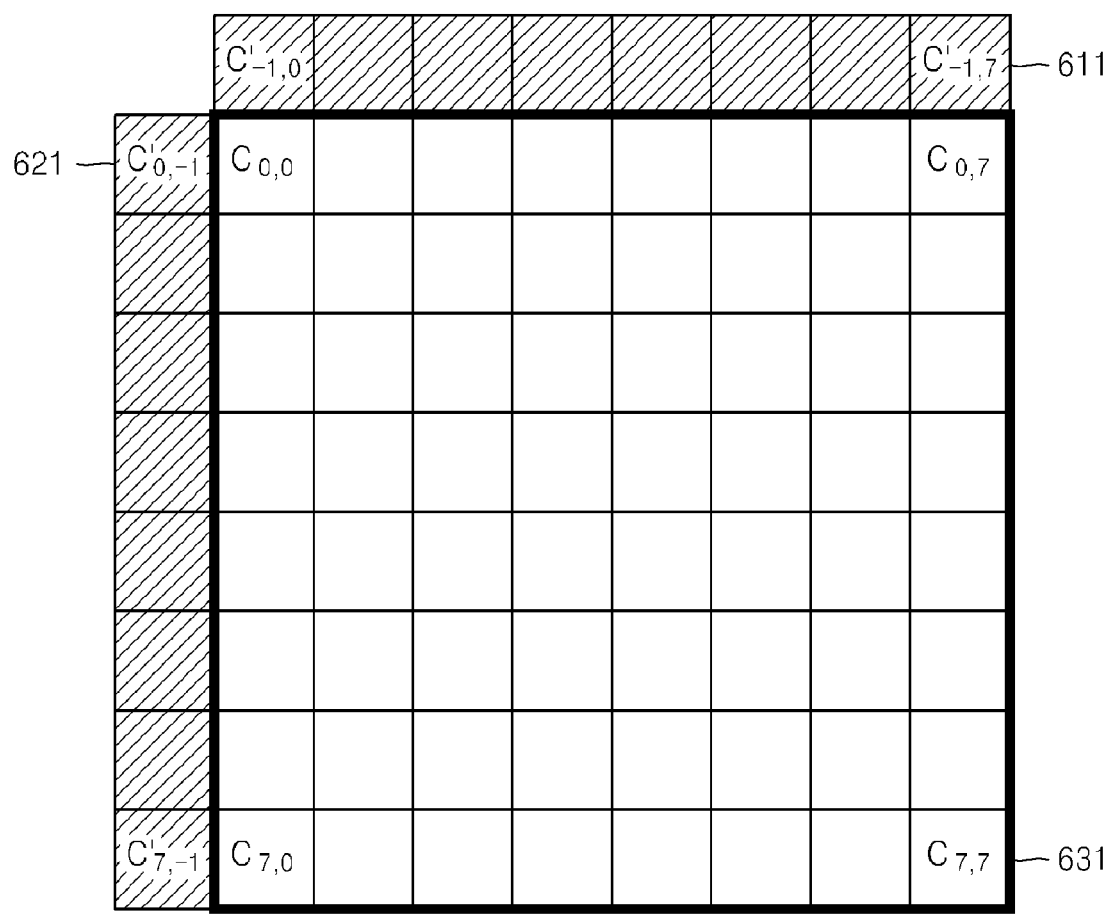
FIG. 6B is a reference diagram illustrating an 8×8 sized current block and neighboring pixels of the current block, according to an exemplary embodiment of the present invention.

FIG. 6A is a reference diagram illustrating an 8×8 sized reference block and neighboring pixels of the reference block, according to an exemplary embodiment of the present invention. FIG. 6B is a reference diagram illustrating an 8×8 sized current block and neighboring pixels of the current block, according to an exemplary embodiment of the present invention. A reference block 630 and neighboring pixels 610 and 620 of FIG. 6A correspond to the reference block 530 and the neighboring pixels 531 and 532 of FIG. 5. A current block 631 and neighboring pixels 611 and 621 of FIG. 6B correspond to the current block 510 and the neighboring pixels 511 and 512 of FIG. 5. For the convenience of description, the current block 631 and the reference block 630 have a size of 8×8; however, the size of the current block 631 and the reference block 630 is not limited to 8×8 and may have other sizes. In addition, in FIG. 6A, $R'_{x,y}$ indicates a recovered pixel which is located at an x-th row and a y-th column (where x or y=−1) neighboring a recovered pixel and a reference block located at an x-th row and y-th column (where x,y=0,1,2, . . . ,7) in the 8×8 sized reference block. That is, $R'_{0,0}$ to $R'_{7,7}$ represent recovered pixels which are located in the reference block 630. $R'_{-1,0}$ to $R'_{-1,7}$ represent recovered neighboring pixels 610 which are adjacent to the upper side of the reference block 630. $R'_{0,-1}$ to $R'_{7,-1}$ represent recovered neighboring pixels 620 which are adjacent to the left side of the reference block 630. Similarly, $C_{x,y}$ of FIG. 6B indicates a recovered pixel which is located at an x-th row and a y-th column (where x or y=−1) neighboring a pixel and a current block located at an x-th row and a y-th column (where x,y=0, 1,2, . . . ,7) in the 8×8 sized reference block. That is, $C_{0,0}$ to $C_{7,7}$ represent pixels in the current block 631. $C'_{-1,0}$ to $C'_{-1,7}$ represent recovered neighboring pixels 611 adjacent to the upper side of the current block 631. $C'_{0,-1}$ to $C'_{7,-1}$ represent recovered neighboring pixels 621 adjacent to the left side of the current block 631.

Referring to FIGS. 6A and 6B, the reference block candidate selection unit 410 calculates an error value d between neighboring pixels 611 and 621 of the current block 631 and the neighboring pixels 610 and 620 of the reference block 630 corresponding thereto by using Equation 1 as follows.

$$d = \sum_{j=0}^{7}|C'_{-1,j} - R'_{-1,j}|^p + \sum_{i=0}^{7}|C'_{i,-1} - R'_{i,-1}|^p \quad \text{[Equation 1]}$$

where p may be an integer equal to or greater than 1.

The reference block candidate selection unit 410 calculates a degree of similarity between the neighboring pixels of the current block and the neighboring pixels of the reference block by using Equation 1, while moving the reference block within a predetermined search area of the current picture. In Equation 1, as a difference between the neighboring pixels of the reference block and the neighboring pixels of the current block, which correspond to the neighboring pixels of the reference block, is increased, the error value d is increased in proportion to the difference. Accordingly, the error value d is inversely proportional to the degree of similarity between the neighboring pixels of the current block and the neighboring pixels of the reference block. When the reference block candidate selection unit 410 calculates the error value d at each position of the reference block by using Equation 1, while moving the reference block, N reference block candidates are selected in an ascending order of the error value d. That is, N reference block candidates are selected in a descending order of the degree of similarity by aligning the reference block candidates in the order of the error value d. At this time, the reference block candidate selection unit 410 allocates indices of 0 to N−1 to N reference block candidates in an ascending order of the error value d. Although in the aforementioned example a case where neighboring pixels with one pixel width are used is described, neighboring pixels used to select reference block candidates may be arbitrarily selected in a region that is previously coded and recovered.

Returning to FIG. 4, if the reference block candidate selection unit 410 selects N reference block candidates, the predicted block determination unit 420 evaluates a degree of similarity between the N reference block candidates and the current block. Since the reference block candidate selection unit 410 selects reference block candidates having neighboring pixels similar to neighboring pixels of the current block without using original pixels in the current block, the reference block candidate having the smallest error value d may not be the block that is most similar to the current block. Accordingly, the predicted block determination unit 420 calculates a matching error D between the selected N reference block candidates and the current block by using Equation 2 as follows:

$$D = \sum_{i=0}^{7}\sum_{j=0}^{7}|C_{i,j} - R'_{i,j}|^p \quad \text{[Equation 2]}$$

where $C_{i,j}$ indicates a pixel located at an x-th row and a y-th column of the current block, and $R'_{i,j}$ indicates a recovered pixel located at an i-th row and a j-th column of a reference block selected from the N reference block candidates. In Equation 2, p may be an integer equal to or greater than 1.

The predicted block determination unit 420 calculates matching errors D between the N reference block candidates and the current block by using Equation 2 and determines a reference block having a least matching error among the N matching errors $D_0$ to $D_{N-1}$ as a predicted block of the current block. At this time, the predicted block determination unit 420 transmits index information allocated to the reference block that is determined to be the predicted block of the current block to the entropy coding unit 312. The entropy coding unit 312 can store the index information allocated to the reference block that is used as the predicted block of the current block in a predetermined area of a coded bitstream. When the index information is set to N=1, that is, in a case where only one reference block candidate having neighboring pixels that are most similar to the neighboring pixels of the current block is selected and used as the predicted block of the current block, it is unnecessary to add index information of the reference block determined as the predicted block of the current block to the coded bitstream. This is because a decoder can use a determined reference block candidate as the predicted block of the current block by determining a reference block candidate having neighboring pixels that are most similar to the neighboring pixels of the current block within a search area that is decoded before the current block is to be decoded.

Returning to FIG. 3, as described above, when the prediction unit 340 determines a predicted block of the current block through the side matching process, the subtraction unit 313 calculates a residual data defined as a difference value between the input current block and the predicted block, and the transformation and quantization unit 311 transforms and quantizes residual data. An example of a transformation process is a discrete cosine transform (DCT) process.

The inverse transformation and inverse quantization unit 321 inverse-quantizes image data quantized by the transformation and quantization unit 311 and inverse-transforms the inverse-quantized image data. For example, inverse discrete cosine transforms the inverse-quantized image data.

The adding unit 322 adds the predicted block of the current block output from the prediction unit 340 and data recovered by the inverse transformation and inverse quantization unit 321 to generate a recovered image.

The storage unit 330 stores image data that is inverse-quantized and inverse-transformed by the inverse-quantization and inverse-transformation unit 321. The recovered image stored in the storage unit 330 is used to generate a predicted block by using an inter prediction process, an intra prediction process, and a side match process of the next block to be coded, according to the current exemplary embodiment of the present invention.

The entropy coding unit 312 outputs a final coded bitstream by receiving and entropy-coding quantized transformation coefficients that are output from the transformation and quantization unit 311, motion information of the current block, index information on the reference block that is used as the predicted block of the current block, and the like. As described above, when indices are allocated to the N reference block candidates in the order of the error values d, the entropy coding unit 312 can insert index information allocated to a reference block that is finally determined to be the predicted block of the current block into a predetermined area of the bitstream by calculating the matching errors D.

The method of generating a predicted block of the current block by using the side matching process may be used with the conventional intra prediction process and the conventional inter prediction process. That is, it is possible to apply a prediction method with less cost to a prediction coding method for the current block by comparing a cost of a bitstream, which is generated by using a predicted block generated through the conventional intra prediction process and the conventional inter prediction process, with a cost of a bitstream, which is generated by using a predicted block generated through a side matching process according to the current exemplary embodiment of the present invention. Here, an RD cost may typically be used. In addition, it is possible to apply a prediction coding method with less distortion to a prediction coding method for the current block by comparing a distortion between a predicted block generated through the conventional intra prediction process and the conventional inter prediction process and the current block with a distortion between a predicted block generated through the side matching process according to the current exemplary embodiment of the present invention and the current block. At this time, in order to calculate a distortion between the current block and the predicted block, a sum of squared difference (SSD) or a sum of absolute difference (SAD) may be used.

When a prediction coding method is performed by combining a method of generating a predicted block of the current block by using the side matching process according to the current exemplary embodiment of the present invention, the conventional intra prediction process, and the conventional inter prediction process, it is necessary to enable the decoder to identify how the bitstream is prediction-coded by inserting one-bit binary information into a header of the bitstream. For example, the binary information in which '0' indicates a bitstream that is coded by applying only the conventional intra prediction process and the conventional inter prediction process, and in which '1' indicates a bitstream that is coded by adaptively applying the side matching process according to the current exemplary embodiment of the present invention and the conventional prediction coding method may be inserted. This binary information may be applied in units of pictures, slices, or blocks. For example, it is possible to perform the prediction coding process by applying the conventional inter prediction process and the conventional intra prediction process to some blocks and by applying the side matching process according to the current exemplary embodiment of the present invention to other blocks.

On the other hand, the method of determining a reference block to be used as a predicted block of the current block by using the side matching process according to the current exemplary embodiment of the present invention may be used to code motion vector information generated through the inter prediction process. According to the conventional technique, a median value of a motion vector of neighboring blocks adjacent to an upper side, an upper-right side, and a left side of the inter-predicted current block is determined as a predicted motion vector (PMV). A difference value, PMV–OMV, between the PMV and an original motion vector (OMV) generated through a process of predicting and compensating is coded as motion vector information of the current block. However, in order to reduce an amount of data generated by coding the motion vector information of the current block, as described above, a reference block candidate having a least matching error is determined by calculating N reference block candidates having neighboring pixels similar to the neighboring pixels of the current block and calculating the matching errors D between the N reference block candidates and the current block. A relative difference in position between the determined reference block candidate and the current block is determined as a new predicted motion vector PMV'. A difference, PMV'–OMV, between the OMV of the current block and the determined PMV' can be coded as motion vector information of the current block.

On the other hand, although in the present invention, a case where only a previously coded area in the current picture is used as a search area is described, the present invention may be applied to a case where a coding process is performed by selecting N reference block candidates having neighboring pixels similar to the neighboring pixels of the current block within previous and next reference pictures of the current picture and by selecting a reference block candidate that is most similar to the current block. That is, a reference block candidate having the least matching error D as a predicted block of the current block is used, so as to substitute for the conventional inter prediction process. In other words, the present invention may be used independently by substituting the conventional intra prediction process and the conventional inter prediction process.

Figure 7:
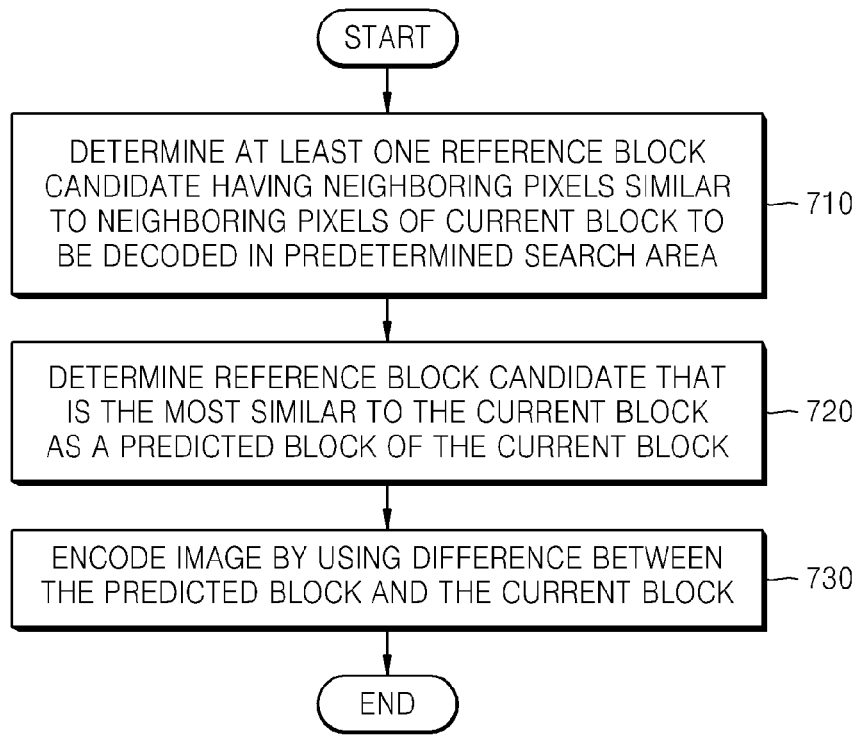
FIG. 7 is a flowchart illustrating an image coding method, according to an exemplary embodiment of the present invention.

FIG. 7 is a flowchart of an image coding method, according to an exemplary embodiment of the present invention.

Referring to FIG. 7, in operation 710, at least one reference block candidate having neighboring pixels similar to neighboring pixels of the current block to be coded in a predetermined search area is determined. Here, an area of the current picture which is coded before the current block is coded, or an area of a reference picture before or after the current picture is coded, can be used as the predetermined search area.

In operation 720, a reference block candidate that is most similar to the current block among N reference block candidates is determined to be a predicted block of the current block. As described above, a matching error D is calculated with respect to the current block and the N reference block candidates by using Equation 2. A reference block candidate having the least matching error D is determined to be a predicted block of the current block.

In operation 730, a residual data defined as a difference value between the predicted block and the current block is transformed, quantized, and entropy-coded to generate a bitstream. At this time, an index allocated to the reference block candidate that is determined to be the predicted block of the current block, among indices allocated to the reference block candidates, is added to the generated bitstream as predicted mode information. In addition, in a case where the conventional intra/inter prediction method and the prediction method according to the current exemplary embodiment of the present invention are used together, predetermined binary information, representing whether the side matching process according to the exemplary embodiment and the conventional prediction process are combined, is inserted in units of pictures, slices, or blocks.

Figure 8:
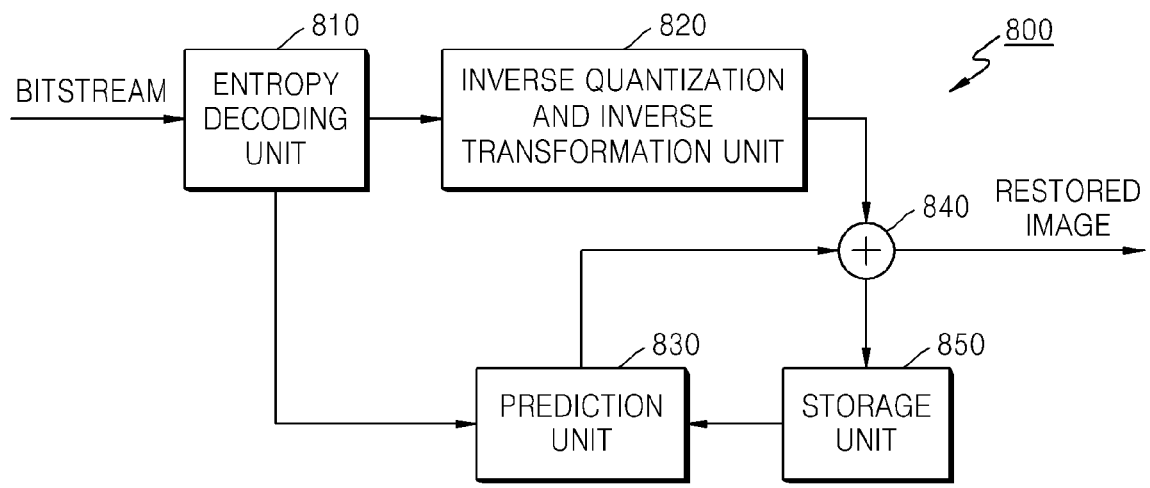
FIG. 8 is a block diagram illustrating a structure of an image coding apparatus, according to an exemplary embodiment of the present invention.

FIG. 8 is a block diagram illustrating a structure of an image decoding apparatus, according to an exemplary embodiment of the present invention.

Referring to FIG. 8, an image decoding apparatus 800 comprises an entropy decoding unit 810, an inverse transformation and inverse quantization unit 820, a prediction unit 830, an adding unit 840, and a storage unit 850.

The entropy decoding unit 810 extracts image data, motion vectors, and prediction mode information used for a coding process by entropy-decoding a coded bitstream. As described above, since the predetermined binary information, representing whether the prediction coding method using the side matching process according to the current exemplary embodiment of the present invention is applied, is inserted in units of pictures, slices, or blocks, it is possible to determine whether a bitstream is coded by applying a coding method according to the exemplary embodiment by detecting the binary information. When the bitstream is coded by applying the coding method according to the current exemplary embodiment of the present invention, index information included in the bitstream is extracted. Thus, the prediction unit 830 can select N reference block candidates through the same procedure as the prediction unit 340 of FIG. 3, align the N reference block candidates in the order of difference values d that are calculated by using Equation 1, and determine a reference block candidate indicated by the extracted index as a predicted block of the final current block. Since a structure and operation of the prediction unit 830 are similar to those of the prediction unit 340 of FIG. 3, the detailed description thereof will be omitted. However, if reference block candidates are selected by a reference block candidate determination unit included in the prediction unit 830, the prediction block determination unit determines a reference block candidate having an index that is the same as the index included in the bitstream as the predicted block of the current block. That is, in a decoding process, indices having the same order as the indices that are allocated to reference block candidates in a coding process are allocated to reference block candidates. Therefore, it is possible to determine a predicted block among the reference block candidates by using index information included in the bitstream.

Entropy-decoded image data is input into the inverse quantization and inverse transformation unit 820. Information on a motion vector and information on a prediction mode used during a decoding process is input into the prediction unit 830.

The inverse transformation and inverse quantization unit 820 performs an inverse transformation and inverse quantization process with respect to the image data extracted by the entropy decoding unit 810. The storage unit 850 stores the image data that is inverse-quantized and inverse-transformed by the inverse transformation and inverse quantization unit 820. The recovery image stored in the storage unit 850 is used as reference data for coding the next block.

The adding unit 840 adds the image recovered by the inverse transformation and inverse quantization unit 820 and the predicted block output from the prediction unit 830, and outputs the addition result.

Figure 9:
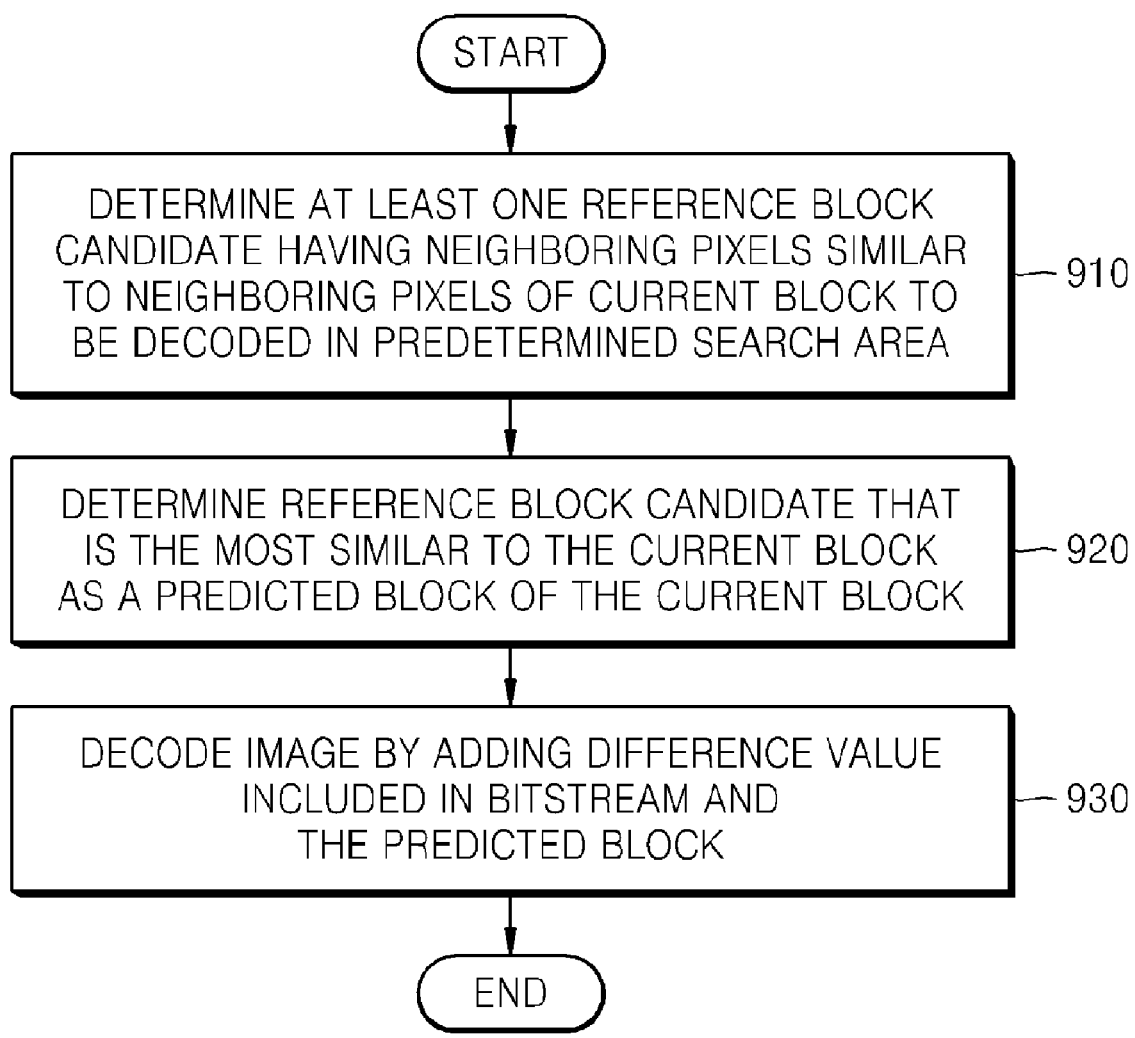
FIG. 9 is a flowchart illustrating an image coding method, according to an exemplary embodiment of the present invention.

FIG. 9 is a flowchart of an image coding method, according to an exemplary embodiment of the present invention.

In operation 910, at least one reference block candidate having neighboring pixels similar to the neighboring pixels of the current block to be decoded in a predetermined search area is determined.

In operation 920, a reference block candidate that is the most similar to the current block among the reference block candidates is determined to be a predicted block of the current block.

In operation 930, an image is decoded by adding the determined predicted block and a recovered residual data, defined as a difference value between the predicted block and the current block included in the bitstream.

While the present invention has been particularly shown and described with reference to exemplary embodiments thereof, it will be understood by those skilled in the art that various changes in form and details may be made therein without departing from the spirit and scope of the present invention as defined by the appended claims. The invention can also be embodied as computer readable codes on a computer readable recording medium. The computer readable recording medium is any data storage device that can store data, which can thereafter be read by a computer system. Examples of the computer readable recording medium include read-only memory (ROM), random-access memory (RAM), CD-ROMs, magnetic tapes, floppy disks, optical data storage devices. In an alternative embodiment, the invention may be embodied on a computer readable transmission medium in the form of carrier waves (such as data transmission through the Internet). The computer readable recording medium can also be distributed over network-coupled computer systems so that the computer readable code is stored and executed in a distributed fashion.

What is claimed is:
1. A method of coding an image, the method comprising:
   determining one or more reference block candidates having neighboring pixels similar to neighboring pixels of a current block that is to be coded in a predetermined search area;
   determining a reference block candidate that is most similar to the current block among the reference block candidates as a predicted block of the current block; and
   coding an image using a difference value obtained from a difference between the predicted block and the current block.
2. The method of claim 1, wherein the predetermined search area is an area within a current picture which is coded before the current block is coded.

3. The method of claim 1, wherein the determining of the reference block candidates comprises:
- calculating a degree of similarity between neighboring pixels of a block having the same size as the neighboring pixels of the current block, while moving the block having the same size as the current block within the predetermined search area; and
- selecting a predetermined number of blocks in the search area in a descending order of the degree of similarity and determining the selected blocks as the reference block candidates.

4. The method of claim 1, wherein the determining of the reference block candidates comprises allocating predetermined indices to the reference block candidates based on an order of the degree of similarity with the current block, and
- wherein the coding of the image further comprises inserting an index allocated to the reference block candidate determined as the predicted block of the current block into a predetermined area of a bitstream as predicted mode information of the current block.

5. The method of claim 1, wherein the predetermined search area is a previous or next reference picture of the current picture comprising the current block.

6. The method of claim 5, further comprising:
- generating a motion vector of the current block by predicting a motion of the current block in the reference picture;
- calculating a predicted motion vector of the current block by using a difference value obtained from a difference between the motion vector of the current block and a position of the reference block candidate that is determined as the predicted block of the current block; and
- coding motion information of the current block by using a difference value obtained from a difference between the predicted motion vector of the current block and the motion vector of the current block.

7. An apparatus for coding an image, the apparatus comprising:
- a prediction unit which determines one or more reference block candidates having neighboring pixels similar to neighboring pixels of a current block that is to be coded in a predetermined search area and which determines a reference block candidate that is most similar to the current block among the reference block candidates as a predicted block of the current block; and
- a coding unit which codes an image by using a difference value obtained from a difference between the predicted block and the current block.

8. The apparatus of claim 7, wherein the predetermined search area is an area in a current picture, which is coded before the current block is coded.

9. The apparatus of claim 7, wherein the prediction unit comprises:
- a reference block candidate selection unit which calculates a degree of similarity between neighboring pixels of a block having the same size as the current block and the neighboring pixels of the current block while moving the block having the same size as the current block within the predetermined search area, which selects a predetermined number of blocks in the search area in a descending order of the degree of similarity, and which determines the selected blocks as the reference block candidates; and
- a predicted block determination unit which determines a reference block candidate that is most similar to the current block among the reference block candidates as the predicted block of the current block.

10. The apparatus of claim 7, wherein the prediction unit allocates predetermined indices to the reference block candidates based on an order of the degree of similarity with the current block, and
- wherein the coding unit inserts an index allocated to the reference block candidate determined as the predicted block of the current block into a predetermined area of a bitstream as predicted mode information of the current block.

11. The apparatus of claim 7, wherein the predetermined search area is a previous or next reference picture of the current picture comprising the current block.

12. The apparatus of claim 11, wherein the prediction unit generates a motion vector of the current block by predicting a motion of the current block in the reference picture and determines a predicted motion vector of the current block by using a difference value obtained from a difference between the motion vector of the current block and a position of the reference block candidate that is determined as the predicted block of the current block, and
- wherein the coding unit codes motion information of the current block by using a difference value obtained from a difference between the predicted motion vector of the current block and the motion vector of the current block.

13. A method of decoding an image, the method comprising:
- determining one or more reference block candidates having neighboring pixels similar to neighboring pixels of a current block that is to be decoded in a predetermined search area;
- determining a reference block candidate that is most similar to the current block among the reference block candidates as a predicted block of the current block; and
- decoding an image by using the predicted block of the current block and a difference value obtained from a difference between the predicted block and the current block included in a bitstream.

14. The method of claim 13, wherein the predetermined search area is an area within a current picture which is decoded before the current block is decoded.

15. The method of claim 13, wherein the determining of the reference block candidates comprises:
- calculating a degree of similarity between neighboring pixels of a block having the same size as the current block and the neighboring pixels of the current block, while moving the block having the same size as the current block within the predetermined search area; and
- selecting a predetermined number of blocks within the search area in a descending order of the degree of similarity, and determining the selected blocks as the reference block candidates.

16. The method of claim 13, wherein the determining of the predicted block of the current block comprises:
- allocating predetermined indices to the reference block candidates in a same order as a coder; and
- determining a reference block candidate having an index that is the same as an index included in the bitstream as the predicted block of the current block.

17. The method of claim 13, wherein the predetermined search area is a previous or next reference picture of the current picture comprising the current block.

18. An apparatus for decoding an image, the apparatus comprising:
- a prediction unit which determines one or more reference block candidates having neighboring pixels similar to neighboring pixels of a current block to be decoded in a predetermined search area and which determines a reference block candidate that is most similar to the current block among the reference block candidates as a predicted block of the current block; and a decoding unit which decodes the image by using the predicted block of the current block and a difference value obtained from a difference between the predicted block and the current block included in a bitstream.

19. The apparatus of claim 18, wherein the predetermined search area is an area in a current picture which is decoded before the current block is decoded.

20. The apparatus of claim 18, wherein the prediction unit comprises:

a reference block candidate determination unit which calculates a degree of similarity between neighboring pixels of a block having the same size as the current block and the neighboring pixels of the current block, while moving the block having the same size as the current block within the predetermined search area, which selects a predetermined number of blocks in the search area in a descending order of the degree of similarity, and which determines the selected blocks as the reference block candidates; and a predicted block determination unit which determines a reference block candidate that is most similar to the current block among the reference block candidates as a predicted block of the current block.

21. The apparatus of claim 20, wherein the reference block candidate determination unit allocates predetermined indices to the reference block candidates in the same order as a coder and determines the reference block candidate having an index that is the same as an index included in the bitstream as the predicted block of the current block.

22. The apparatus of claim 18, wherein the predetermined search area is a previous or next reference picture of the current picture comprising the current block.

23. A non-transitory computer readable recording medium having recorded thereon a computer program for executing, in a computing device comprising a processor having computing device-executable instructions, a method of coding an image, the method comprising:

determining, using the processor, one or more reference block candidates having neighboring pixels similar to neighboring pixels of a current block that is to be coded in a predetermined search area;

determining a reference block candidate that is most similar to the current block among the reference block candidates as a predicted block of the current block; and coding an image using a difference value obtained from a difference between the predicted block and the current block.

24. A non-transitory computer readable recording medium having recorded thereon a computer program for executing, in a computing device comprising a processor having computing device-executable instructions, a method of decoding an image, the method comprising:

determining, using the processor, one reference block candidates having neighboring pixels similar to neighboring pixels of a current block that is to be decoded in a predetermined search area;

determining a reference block candidate that is most similar to the current block among the reference block candidates as a predicted block of the current block; and decoding an image by using the predicted block of the current block and a difference value obtained from a difference between the predicted block and the current block included in a bitstream.

* * * * *